H. LEVINE

Nov. 1, 1932. Re. 18,639

TWO-PIECE BOX OR CARTON

2 Sheets-Sheet 1

Original Filed Feb. 27, 1930

Inventor:
Henry Levine
By F. DeWitt Goodwin
Attorney

H. LEVINE

Nov. 1, 1932.

TWO-PIECE BOX OR CARTON

Re. 18,639

Original Filed Feb. 27, 1930 2 Sheets-Sheet 2

Inventor,
Henry Levine
By F. DeWitt Goodwin
Attorney

Reissued Nov. 1, 1932

Re. 18,639

UNITED STATES PATENT OFFICE

HENRY LEVINE, OF PHILADELPHIA, PENNSYLVANIA, ASSIGNOR TO LEON BENOIT, OF CHICAGO, ILLINOIS

TWO-PIECE BOX OR CARTON

Original No. 1,838,997, dated December 29, 1931, Serial No. 431,732, filed February 27, 1930. Application for reissue filed July 11, 1932. Serial No. 621,997.

My invention relates to improvements in a box or carton adapted for carrying eggs.

The object of my invention is to provide a collapsible box, the body of which is formed from a blank comprising a single sheet of material, such as cardboard, which may be readily folded and secured together to form the box; a further object is to form the box from a blank which is cut in symmetrical formation forming longitudinal sections, the outer ones of which may be placed together in parallel relation to each other to form a central upstanding longitudinal rib extending through the box for adding rigidity to the latter and forming separate compartments for the articles which are to be carried in the box; a further object is to arrange the blank so that the central section thereof is divided into transverse partitions which unite the opposite side walls to the box and also hold the bottom sections in proper relation with the side walls when interlocked with said longitudinal rib; a still further object is to provide novel locking means for interlocking the parts of the box; a still further object is to provide the side walls of the box with panels frangibly connected with the walls and located adjacent to each compartment of the box, which panels may be pushed inwardly by a slight pressure of the fingers causing one edge of the panel to swing as upon a hinge on the side wall, whereby the free edge of the panel will swing inwardly against the egg for lifting the latter out sufficiently so that the egg will be accessible at the top of the box, thus avoiding the necessity of forcing the fingers around the egg, from the top of the box, when it is desired to remove the egg; and a still further object is to provide a lid which is entirely detachable from the body of the box and providing fastening means along the opposite edges of the lid for interlocking it with the box body at intervals throughout the length of the box.

These, together with various other novel features of construction and arrangement of the parts, which will be more fully hereinafter described and claimed, constitute my invention.

Referring to the accompanying drawings—

Figure 4:
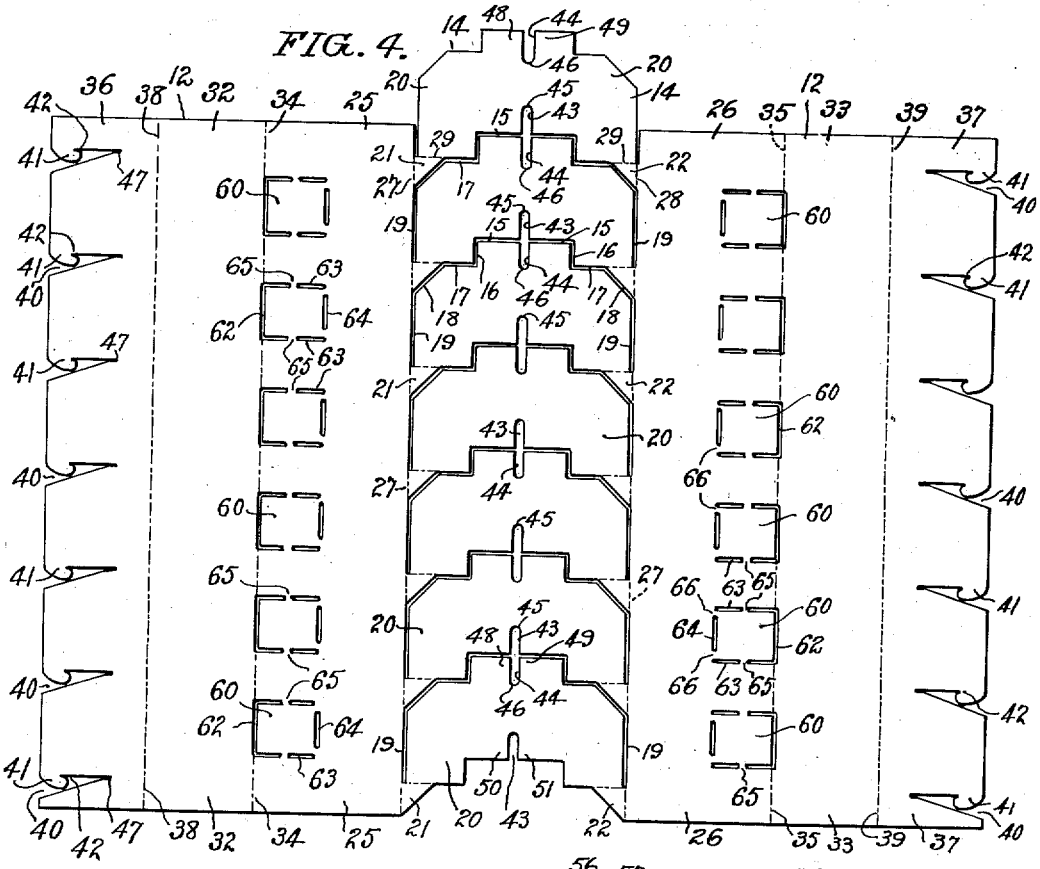
Fig. 4 is a plan view of the blank cut and scored from which the box may be formed.

In the accompanying drawings in which like reference characters refer to like parts, 10 represents the body of my improved box, adapted to be formed from a blank comprising a single sheet of cardboard 12, shown in Fig. 4. The blank 12 is scored to form folding lines to define the longitudinal sections which are adapted to be folded along said lines to form a rectangular box. The central or top section 14 of the blank is provided with slits 15, 16, 17, 18 and 19 to form transverse partitions 20 which are integrally connected by webs 21 and 22 with side wall sections 25 and 26, which latter are foldable along the scoring lines 27 and 28 and along the slits 19 into a vertical position. The transverse partitions 20 may be folded along the scoring lines 29 and the slits 17 into a vertical position, and the side walls 25 and 26 may also be folded into a vertical position, relatively to the webs 21 and 22, thus forming a series of compartments extending throughout the length of the box, and arranged between the partitions 20 and the side walls 25 and 26, which latter are held together at their upper edges by the partitions 20.

Figure 1:
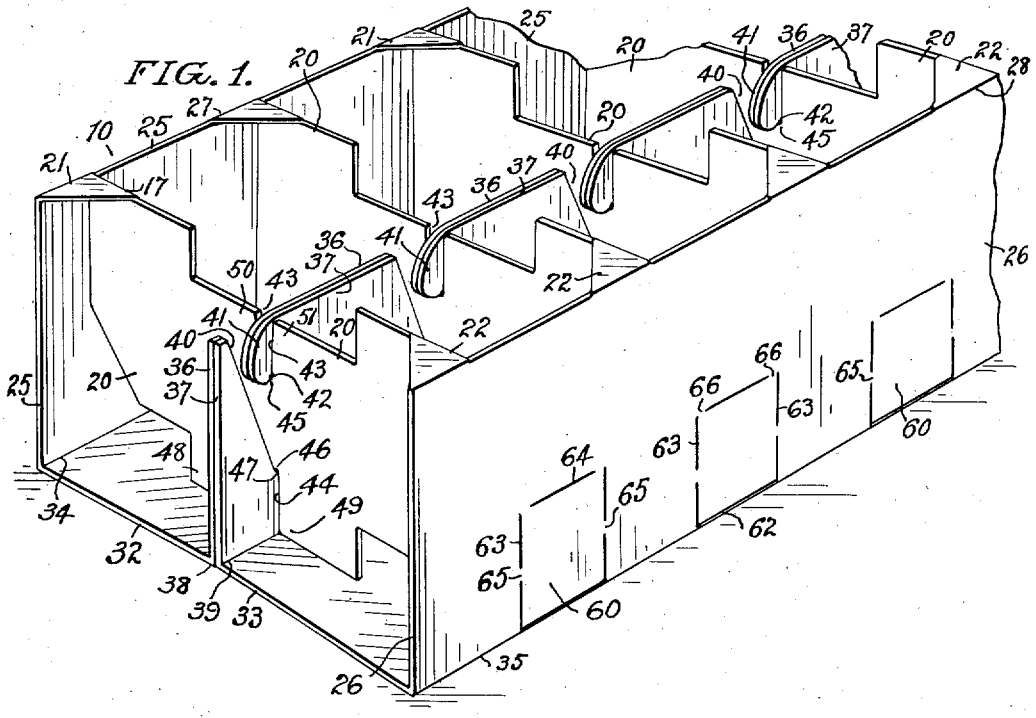
Figure 1 is a partial perspective view of the box embodying my invention.
Figure 2:
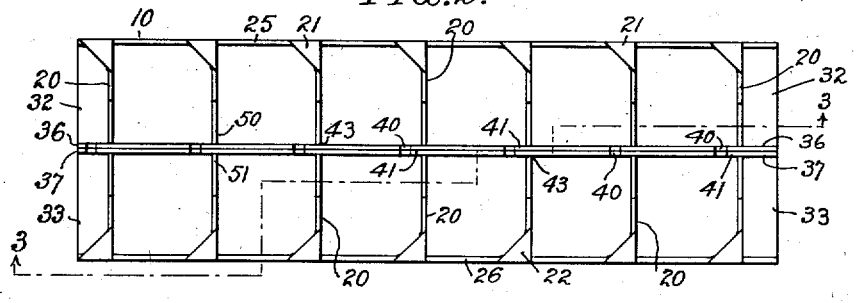
Fig. 2 is a plan view of the body of the box drawn on a smaller scale.
Figure 3:
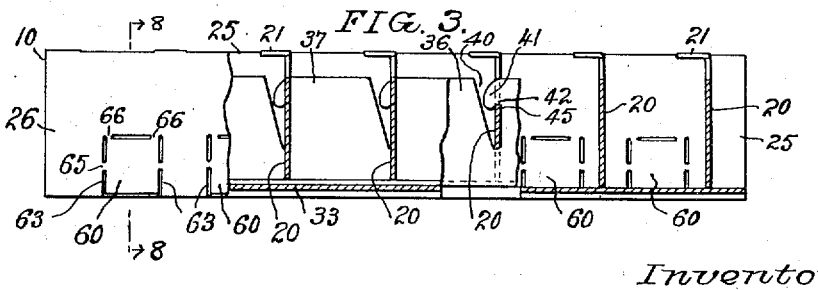
Fig. 3 is a longitudinal vertical section, as on line 3—3 of Fig. 2.
Figure 7:
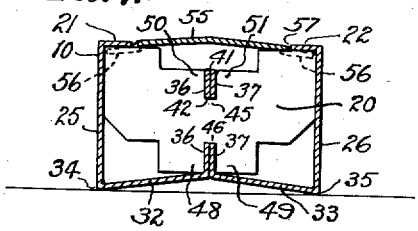
Fig. 7 is a transverse section on line 7—7 of Fig. 6.
Figure 8:
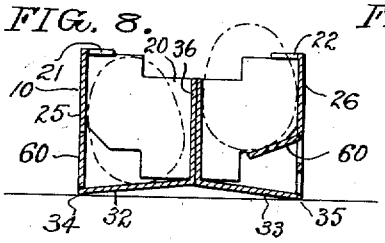
Fig. 8 is a transverse section on line 8—8 of Fig. 3, showing the frangible panel swung inwardly for removing the egg.
Figure 6:
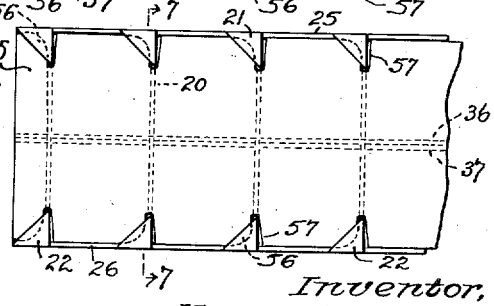
Fig. 6 is a partial plan view of the box with the lid attached.

The side walls 25 and 26 are integrally connected with bottom walls 32 and 33 and are defined by the scoring lines 34 and 35, along which the bottom sections may be folded, as shown in Figs. 1, 7 and 8. The extreme outer edges of the blank terminate with rib sections 36 and 37 which are formed integral with the bottom sections 32 and 33 and are foldable upon the latter along the scoring lines 38 and 39.

Said rib sections 36 and 37 are provided with slits or notches 40 and hooked shaped projections 41 extending into said notches. Said projections 41 have recesses 42 which are occupied by the edges of the partitions 20. The slits 40 and the projections 41 formed upon the opposite edges of the rib sections are counterparts of each other, so that when the rib sections 36 and 37 are placed in parallel relation with each other, as shown in Fig. 1, the slits and projections will register, thus forming a double thick longitudinal rib or partition which is provided with a row of notches and hooked shaped projections formed upon the upstanding edges of the rib sections adapted for interlocking with the transverse partitions 20.

The transverse partitions 20 are provided with slits or notches 43 and 44, which extend parallel with the longitudinal center line of the blank. Said notches are located upon the top and bottom edges of each partition. Shoulders or stops 45 and 46 are formed at the inner ends of the notches 43 and 44 respectively. The shoulders 45 are engaged by the hooked shaped projections 41 on the longitudinal rib sections 36 and 37 when the partitions 20 are inserted into the slits 40 formed in the rib sections. Said hooked shaped projections 41 extend over the partitions with the shoulders 45 upon the latter entering the notches 42, provided for holding the upper edges of the partitions engaged by the projections 41. By this arrangement the longitudinal ribs 36 and 37 are supported upon the transverse partitions by the hooked shaped projections 41, thus supporting the bottom sections 32 and 33 upon the transverse partitions 20, which latter in turn are supported by the webs 21 connected with the upper edges of the vertical side walls.

The notches 40 formed in the longitudinal rib have shoulders 47 formed at the lower ends thereof, which shoulders 47 engage the shoulders 46 upon the under side of the transverse partitions, thus preventing the longitudinal ribs from moving upwardly. The transverse partitions 20 have lower central portions 48 and 49 located at opposite sides of the notches 44, which portions 48 and 49 embrace the rib sections and hold them tightly against each other. The transverse partitions 20 have upper central portions 50 and 51 located adjacent to the upper notches 43 which engage the top edges of the longitudinal rib sections 36 and 37 and hold the layers thereof tightly together to form a rigid longitudinal rib extending throughout the length of the box. The transverse partitions 20 are arranged so that the longitudinal rib sections will be supported entirely upon the transverse partitions, and the bottom sections 32 and 33 will be inclined upwardly toward the central longitudinal rib above the plane extending through the corners formed by the lower edges of the side walls with the bottom sections. Thus the central portion of the bottom sections will be elevated from the base line, or plane, upon which the lower edges of the side walls of the box rest, as shown in Fig. 7. By thus elevating or inclining the bottom sections a cushion is formed for the eggs, to prevent them from breaking.

Figure 5:
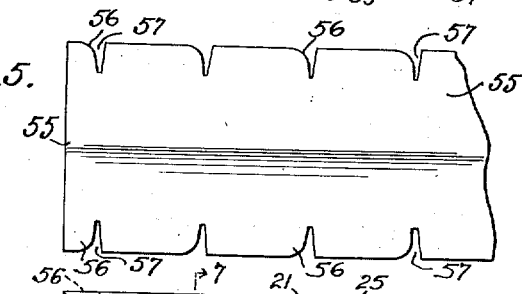
Fig. 5 is a partial plan view of the lid detached.

A lid 55, separate from and independent of the box, is attachable thereto or to a box whose construction is appropriate for its reception. In the form shown, the webs 21 and 22 may be utilized as means for attaching the lid in place. For cooperation with webs, such as are shown and described herein, the lid may be provided with tongues and slits 56 and 57 respectively, which are formed along the opposite longitudinal edges of the lid, as shown in Fig. 5. The slits 57 are adapted to embrace the upper edges of the transverse partitions 20. The tongues 56 are provided with rounded portions adapted to extend under the webs 21 and 22 upon the body of the box. The lid 55 is of flat formation and rests upon the upper edges of the transverse partitions 20. The lid may be curved or ribbed along its central longitudinal axis for more readily inserting the tongues 56 under the webs 21. The lid formed in this manner may be quickly attached by a slight pressure adjacent to the tongues 56 for forcing the latter under the webs 21 of the body. When it is desired to remove the lid from the body, a pulling force applied to either end of the lid will cause the rounded tongues 56 to be withdrawn from the webs 21; thus the lid may be stripped from the body of the box by a single pulling operation.

The side walls 25 and 26 of the box body are provided with panels 60, which are of a suitable size for the end of the finger to be inserted through the space occupied by the panel. A panel 60 is located adjacent to each egg compartment formed by the transverse partitions 20. The panels 60 are defined upon the side walls by means of slits 62, 63 and 64. The slits 62 separate the lower edges of the panels from the adjacent bottom sections. The vertical slits 63 are separated by webs 65 which frangibly connect the panels with the side walls, and the upper edges of the panels 60 are hingedly connected with the side walls by means of the webs 66. By this arrangement, the lower edges of the panel 60 may be pushed inwardly, as shown in Fig. 8, by a slight pressure of the fingers which will sever the webs 65, thus allowing the panel to be swung inwardly against the lower portion of the egg for lifting the egg from the compartment, as illustrated in Fig. 8.

Various changes may be made in the construction and the arrangement of the parts without departing from my invention.

I claim:

1. A box comprising longitudinal side wall and bottom sections formed from a blank having longitudinal folding scores, a centrally located section of the blank having transverse partitions formed by slitting the blank whereby the transverse partitions are connected with the opposite side walls and foldable transversely to the latter, longitudinal outer sections upon said blank integral with the bottom sections adapted to be folded upwardly from the bottom sections with their free edges extending into the central portion of the box adjacent to each other forming an upstanding longitudinal rib, and means provided in the free edges of said outer sections engageable with the upper edges of said transverse partitions for locking the latter in secure position.

2. A box comprising longitudinally extending side walls, a series of transverse vertical partitions integrally connected at their ends with said side walls, bottom wall sections integrally connected with the lower edges of the side walls, rib sections integrally connected with the edges of the bottom sections, said rib sections having their free edges projecting upwardly above the bottom wall sections to form a central longitudinal partition, and means provided in the free edges of said rib sections for interlocking engagement with said transverse partitions.

3. A box comprising vertical side walls, transverse partitions integrally connected with the side walls at the top edges of the latter, bottom wall sections integrally connected with the side walls at the lower edges of the latter, rib sections integrally connected with the bottom wall sections, said rib sections positioned one against the other with upstanding edges to form a longitudinal partition extending the length of the box, and means formed in the free edges of said rib sections for interlocking the longitudinal rib sections with said transverse partitions whereby the latter are supported in position by said ribs.

4. A box comprising longitudinally extending side walls, a series of transverse vertical partitions integrally connected at their ends with said side walls, bottom wall sections integrally connected with the lower edges of the side walls, rib sections integrally connected with the edges of the bottom sections, said rib sections having their free edges projecting upwardly above the bottom wall sections to form a central longitudinal partition, said transverse partitions having vertical slits formed therein occupied by the rib sections for holding the latter adjacent to each other, said rib sections having vertical slits formed therein occupied by the transverse partitions, and stops upon the rib sections defining the ends of said vertical slits in said ribs engaging the transverse partitions for holding the rib sections against displacement relatively to the transverse partitions.

5. A box comprising longitudinally extending vertical side walls, transverse vertical partitions integrally connected at their opposite ends with the top edges of the side walls, bottom wall sections integrally connected with the lower edges of the side walls, rib sections integrally connected with the inner edges of the bottom sections, said transverse partitions having the lower edges thereof slitted to embrace the rib sections and hold them adjacent to and in parallel relation with each other, hooked shaped projections upon said rib sections extending above and interlocked with the transverse partitions and supported by the latter, whereby the rib sections will support the central part of the bottom sections in spaced relation with the plane in which the corners formed by the lower edges of the side walls with the bottom sections are located.

6. A box comprising vertical side and bottom walls, transverse partitions forming a series of compartments, horizontal webs connecting the upper edges of the side walls with the partitions, a flat lid having slits formed in the edges thereof adapted to embrace the partitions, tongues upon said lid located adjacent to said slits, and said tongues having rounded edges adapted to extend under said webs.

7. A box comprising vertical side and bottom walls, transverse partitions forming a series of compartments, horizontal webs connecting the upper edges of the side walls with the partitions, a flat lid having slits formed upon the opposite longitudinal edges thereof, said slits adapted to embrace the upstanding partitions, and tongues located upon opposite edges of the lid adjacent to said slits adapted to extend under said webs for detachably securing the lid upon the box.

8. A box comprising a blank having folding scores extending longitudinally of the box forming a centrally located top section, a series of transverse partitions formed upon the top section, side wall sections located at opposite sides of said central top section integrally connected by said transverse partitions, bottom sections located at opposite sides of the side wall sections integrally connected with the latter, rib sections located at opposite sides of and integrally connected with the bottom sections and terminating the opposite edges of the blank, said side and bottom sections adapted to be folded to form a rectangular box with said rib sections located side by side and projecting into the interior of the box to form a longitudinally extending central rib, said transverse partitions having slots formed therein adapted to be occupied by the upstanding rib sections, said rib sections having slots formed therein adapted to be occupied by said partitions, and hooked shaped projections upon said rib sections extending over and supported by said partitions.

9. A cellular box open at the top having a bottom from which upstand sides connecting integrally at their upper edges with partitions which extend transversely between the sides, a lid formed independently of the box and separable therefrom, and means adjacent the upper edges of the partitions adapted to engage the proximate edges of the lid to secure the latter in place detachably over the open upper side of the box.

10. A cellular box open at the top having longitudinal sides in connecting relation with transverse partitions, a lid formed independently of the box and separable therefrom, and means adjacent the upper edges of the partitions adapted to engage the proximate edges of the lid to secure the latter detachably over the open upper side of the box.

HENRY LEVINE.